(12) United States Patent
Hiltunen et al.

(10) Patent No.: US 7,070,645 B2
(45) Date of Patent: Jul. 4, 2006

(54) PROCESS AND APPARATUS FOR SEPARATING TWO PHASES FROM EACH OTHER

(75) Inventors: Jyrki Hiltunen, Sipoo (FI); Kauko Suppola, Huuvari (FI)

(73) Assignee: Fortum Oy J, Espoo (FI)

( * ) Notice: Subject to any disclaimer, the term of this patent is extended or adjusted under 35 U.S.C. 154(b) by 136 days.

(21) Appl. No.: 10/472,506

(22) PCT Filed: Mar. 20, 2002

(86) PCT No.: PCT/FI02/00233

§ 371 (c)(1),
(2), (4) Date: Sep. 22, 2003

(87) PCT Pub. No.: WO02/081043

PCT Pub. Date: Oct. 17, 2002

(65) Prior Publication Data

US 2004/0103786 A1    Jun. 3, 2004

(30) Foreign Application Priority Data

Mar. 20, 2001 (FI) .................... 200010570

(51) Int. Cl.
*B01D 45/12* (2006.01)

(52) U.S. Cl. .................. 95/271; 55/343; 55/347; 55/348; 55/459.1

(58) Field of Classification Search .......... 55/343, 55/346, 347, 348, 459.1
See application file for complete search history.

(56) References Cited

U.S. PATENT DOCUMENTS

| | | | | |
|---|---|---|---|---|
| 2,542,549 A | * | 2/1951 | McBride | 55/343 |
| 2,806,551 A | * | 9/1957 | Heinrich | 55/340 |
| 3,448,563 A | | 6/1969 | Sobeck | |
| 3,716,003 A | | 2/1973 | Battcock | |
| 6,022,390 A | | 2/2000 | Jakkula | |

FOREIGN PATENT DOCUMENTS

| | | |
|---|---|---|
| DE | 914 701 C | 7/1954 |
| EP | 0 581 977 A1 | 2/1994 |
| GB | 2 092 483 A | 8/1982 |
| GB | 545624 A | 6/1992 |
| WO | WO 99/32583 A1 | 7/1999 |

* cited by examiner

*Primary Examiner*—Robert A. Hopkins
(74) *Attorney, Agent, or Firm*—Birch, Stewart, Kolasch & Birch, LLP

(57) ABSTRACT

The invention relates to a method and apparatus for separating two phases from each other. According to the invention, a stream made up of at least two phases is directed to a separation apparatus, which comprises a separation container (25) and cyclones (26) arranged in the flow direction in parallel and in succession, the cyclones having each an elongate separation chamber wherein the phases are separated from each other. According to the invention, the cyclones used are multi-inlet cyclones (26), the total number of which is at least 10. The stream to be treated is directed to each multi-inlet cyclone (26) in a substantially radial direction. Through the placement of a large number of multi-inlet cyclones in parallel, a purification element resembling a filter is obtained. In comparison to a filter, continuous regeneration takes place in the element, in which case the pressure loss does not increase during operation, since solids do not reduce the cross-sectional area of the flow conduit inside the element.

32 Claims, 5 Drawing Sheets

Fig. 7 Det. X

PROCESS AND APPARATUS FOR SEPARATING TWO PHASES FROM EACH OTHER

This application is the national phase under 35 U.S.C. § 371 of PCT International Application No. PCT/FI02/00233 which has an International filing date of Mar. 20, 2002, which designated the United States of America.

The present invention relates to a method for the separation of two phases from each other.

According to such a method, a stream composed of at least two phases is directed to a separation apparatus, which includes cyclones arranged in parallel and in succession in the flow direction, the cyclones having an elongate separation chamber, wherein the phases are separated from each other.

The invention also relates to a cyclone system which includes cyclones arranged in parallel and in succession characterized in that the cyclones are multi-inlet cyclones the total number of which is at least 10 and in which the separated phases are removed in the same direction. The invention further relates to a separation apparatus which includes a separation container having a feed port for the stream to be treated, an outlet port for the treated stream, and, in the bottom of the separation container, an outlet port for the separated phase; and a cyclone system arranged inside the separation container, the system having cyclones arranged in parallel in the direction of the flow, each system having an elongate separation chamber in which the phases of the stream directed into the cyclone can be separated from each other.

Furthermore, the invention relates to a multi-inlet cyclone which includes an elongate, at least substantially cylindrical separation chamber having an inlet end for the stream being treated and an outlet end for the solid or liquid material separated from the stream, a cover covering the inlet end of the separation chamber and a vane system arranged at the inlet end of the separation chamber for guiding the stream being treated against the wall of the separation chamber, characterized in that the vane system is formed as a piece integral with the cover covering the inlet end of the separation chamber, the vanes being made up of strips formed on the outer edge of the cover by cutting and bending into the desired position.

BACKGROUND OF THE INVENTION

In strongly exothermal or endothermal reactions, such as catalytic cracking, dehydrogenation and the combustion of solid fuels, there are used fluid-bed reactors (fluid catalytic reactors or fluid-bed boilers). By "fluid-bed apparatus" is meant below an apparatus used in processes wherein a finely-divided catalyst powder or solid is distributed in, for example, a gas stream moving slowly upwards, wherein it causes the desired reactions and/or transports thermal energy.

One of the most commonly used fluid-bed apparatuses is the FCC apparatus, i.e. fluid catalytic cracking apparatus, the main components of which are a riser operating in the range of a rapid fluidizing flow, a large-volume reactor operating in a dilute suspension phase, and a regenerator operating in the fluid-bed range.

In an FCC unit, the solid particles and product gas of the solids suspension obtained from the riser and the large-volume reactor are separated from each other in cyclones the operation of which is based on the exploitation of centrifugal force. Usually cyclones are installed in series in the direction of the gas flow in order to improve the total separation degree, since the degree of separation of normal individual cyclones is poor with particles of less than 15 μm.

The cyclones may be by structure helical or spiral, in which case the solids suspension is introduced as a tangential stream into the cylindrical part of the cyclone and the catalyst separates from the gas by passing to the vicinity of the wall, the stream typically circulating 7–9 rotations in the cylindrical part of the cyclone and in the conical part constituting its continuation. There are also known axial cyclones wherein a gas traveling in a pipe is brought by means of a vane system into a rotary motion, whereupon the solids are driven under centrifugal force to the wall of the pipe, thus separating from the gas stream.

Axial-flow cyclones are described in GB patent publications 1 592 051 and 1 526 509. The axial-flow cyclone according to these publications has a tubular cyclone chamber at the upstream end of which there is an inlet for the stream to be treated and at the other end an outlet for purified gas. It is proposed that the said cyclones be used in combustion, diesel and jet engines, turbines or similar apparatuses requiring pure feed air.

Stricter air protection requirements and the lowering of pressure, carried out by means of turbines, of the FCC regeneration gas, in order to make the use of energy more efficient, set even stricter limitations than previously on the dust content in FCC. It is possible to improve the separation efficiency by reducing the diameter of the cyclone, but the number of cyclones has to be increased correspondingly. It can be stated in general that the separation of small particles requires a small-diameter cyclone. However, the manufacture of small cyclones increases the cost of investment of the apparatus, unless there is used a structure allowing mass production by using, for example, thin-sheet technology. Furthermore, the manufacture of small parts, for example the welding of small vanes, is a problem in conventional methods. Commercial multi-cyclone options (e.g. Shell's TSS) for their part require a large-volume pressure vessel. The structure of multi-cyclones becomes a problem when the direction in which the gas is directed is the same as that from which it comes.

The problems involved with conventional FCC units include, in addition to deficient separation capacity, also the erosion of the catalyst/solid and the structures. The problems are most commonly associated with the gas and solids/catalyst separation cyclones that constitute an essential part of the apparatus. To prevent wear, conventional cyclone structures have to be lined with a ceramic paste. The problems caused by erosion become emphasized when the diameter of the cyclone is reduced.

The object of the present invention is to eliminate the disadvantages associated with the state of the art and to provide a novel option for the separation of solids from gases.

The invention is based on the idea that a separation apparatus is used which comprises a plurality of normal-structured but relatively small-sized multi-inlet cyclones arranged in parallel, the cyclones together constituting a cyclone system, i.e. a configuration made up of a plurality of cyclones.

The separating of solids from a gas stream with the help of a cassette containing a plurality of cyclone units is previously known from CA patent 853 025, DE patents 1 004 463 and 1 058 343 and U.S. Pat. Nos. 2,806,551 and 3,448,563. DE patent publication 1 058 343 and CA patent publication 853 025 disclose a cassette made up of axial-cyclone units, wherein the stream is directed to the cyclone in the axial direction. Owing to the feed direction the stream arrives in the cyclone chamber as a relatively wide jet, in which case the particles have on average a moderately long distance to travel from the feed inlet to the wall. Structurally known apparatuses are partly quite complicated, and their degree of separation is not sufficient to take into account the stricter requirements mentioned above.

GB patent publication 545 624 describes a cyclone unit in which a stream containing particles (dust) enters the cylindrical pipes of the cyclone system from the side via special inlets, and the stream is brought into a rotary motion. The separated dust flows down along the pipe wall into a collection silo, whereas the gas stream turns, in the manner of a conventional cyclone separator, upwards to an outlet pipe, to be directed away from it. The operation of the cyclone is based on the reverse flow principle, which leads to a relatively complicated structure.

SUMMARY OF THE INVENTION

According to the present invention, the multi-cyclone is implemented using multi-inlet cyclones by fitting at least 10 multi-inlet cyclones in parallel and in succession in the flow direction of the material to be treated. With cyclones such as this, high separation efficiency is achieved, combined with a simple and economical structure. Furthermore, the high separation efficiency makes a compact structure possible.

The cyclone system can be formed by installing the separation chambers of the individual cyclones between two sheets fitted at a distance from each other and defining, between them, a partly closed space which serves as a collection and outlet conduit for the phase, e.g. solids, separated in the separation container. The cyclone system can in this case be installed and replaced easily like a cassette.

A multi-cyclone made up of multi-inlet cyclones can be fitted in a separation container which has a feed port for the stream to be treated, an outlet port for the treated stream and an outlet port for the separated phase, whereby there is obtained a separation apparatus which allows a through-flow of gas and is suited for the separation of two phases from each other. Owing to the advantageous structure of the multi-inlet cyclone system, the ratio of the cross-sectional area of the separation container to the cross-sectional area of the inlet conduit may be small, typically approx. 1–20.

According to the invention, the multi-inlet cyclones of the multi-cyclone can be implemented using conventional technology. A cyclone comprises an elongate, at least substantially cylindrical separation chamber having an inlet end for the stream to be treated and an outlet end for the solids or liquid material separated from the stream, a cover for the inlet end of the separation chamber, and a vane system arranged at the inlet end of the separation chamber to guide the stream being treated against the wall of the separation chamber. According to the invention, the vane system is made so as to form an integral part of the cover covering the inlet end of the separation chamber, and the vanes consist of strips formed on the outer edge of the sheet-like cover by cutting and by bending into the desired position.

More precisely, the method according to the invention is mainly characterized in what is stated in the characterizing part of Claim 1.

The invention provides considerable advantages. Thus, when a large number of multi-inlet cyclones are placed in parallel, a purification element resembling a filter is obtained. The essential idea is that gas flows through the apparatus and that the solids are separated into the intermediate space. Compared with a filter, continuous "regeneration" occurs in the element, and thus the pressure loss does not increase during operation, since the solids do not reduce the cross-sectional area of the flow conduit inside the element. A system such as this enables the separation efficiency of the cyclone unit to be increased by the reduction of the cyclone size, but without increasing the cost of manufacturing the apparatus. Furthermore, the cyclone can be dimensioned so as to be optimal with respect to the suspension properties.

Preferably the flow is implemented as a uniflow-type flow, which means that the separated phases are removed in the same direction. In this respect the option according to the invention differs from the prior-known options in which the purified gas stream is removed against the feed stream.

Shear stresses, which cause erosion, are in the multi-inlet multi-cyclone according to the invention smaller than in conventional multi-cyclones, for example the above-mentioned multi-cyclones based on axial cyclones. Implemented with multi-inlet cyclones and in the manner described in the invention, the multi-cyclone is more efficient and more economical than the multi-cyclone based on axial cyclones. In an axial cyclone, the solids-containing flow cannot be accelerated in the flow duct, which would be desirable in order to increase separation efficiency. A multi-inlet cyclone, instead, has typically straight vanes by means of which the stream is divided into partial streams, and the flow velocity of each of these streams can be accelerated effectively. Straight vanes are less prone to wear than curved vanes, since they are not oriented substantially to deflect the flow direction but only to accelerate the gas flow velocity.

In an FCC apparatus the multi-inlet multi-cyclone serves especially effectively as the separator of stage 2 or 3, since the stream is brought close to the wall of the separation chamber by means of the said vanes. Indeed, with the apparatus according to the invention, small particles, especially the above-mentioned particles less than 15 µm in size, can be separated from the exit gases more effectively than at present, and thus, with a very economical option, an FCC apparatus can be brought to meet the increasingly strict requirements concerning FCC dust content.

By the use of the multi-inlet multi-cyclone according to the invention and present-day FCC catalysts, it is possible to reach a dust content below 50 $mg/Nm^3$ in exit gas if the apparatus serves as a secondary or tertiary separator.

The present option can also be used at very high temperatures, for example in connection with hot combustion gases or reaction products. Thus the invention is also suitable for use in energy production, where the problem is that often there arrive at the electro-filters considerable amounts of unburnt components that load and soil the electro-filter. By the use of the cyclone system according to the invention, it is possible to reduce the use of electro-filters, which are considerably more expensive in terms of investment, space requirement and operating costs. A multi-inlet cyclone system can be fitted in particular at a point upstream of an electro-filter to remove unburnt components and fly ash.

By the use of more efficient cyclone separation, unburnt components can be recycled to the combustion process, and thus the efficiency can at the same time be raised. In certain cases the electro-filter can be replaced entirely.

The multi-inlet cyclone according to the invention, wherein the separation chamber cover with its guide vanes is formed by cutting and bending from a suitable sheet-like blank, is in terms of manufacturing technology a very economical option, enabling multi-inlet cyclones to be mass produced. The technique can be applied to different materials, both plastics and metals. Thus a cyclone cap (see below in greater detail) functioning at low temperatures can be made, for example, from plastic by injection molding, and those functioning at higher temperatures by casting or by work methods associated with thin-sheet technology.

BRIEF DESCRIPTION OF THE DRAWINGS

The invention will be described below in greater detail, with reference to the accompanying drawings.

FIG. 7 depicts a detail of FIGS. 5 and 6 of an individual cyclone element.

DETAILED DESCRIPTION OF THE INVENTION

Figure 1B:
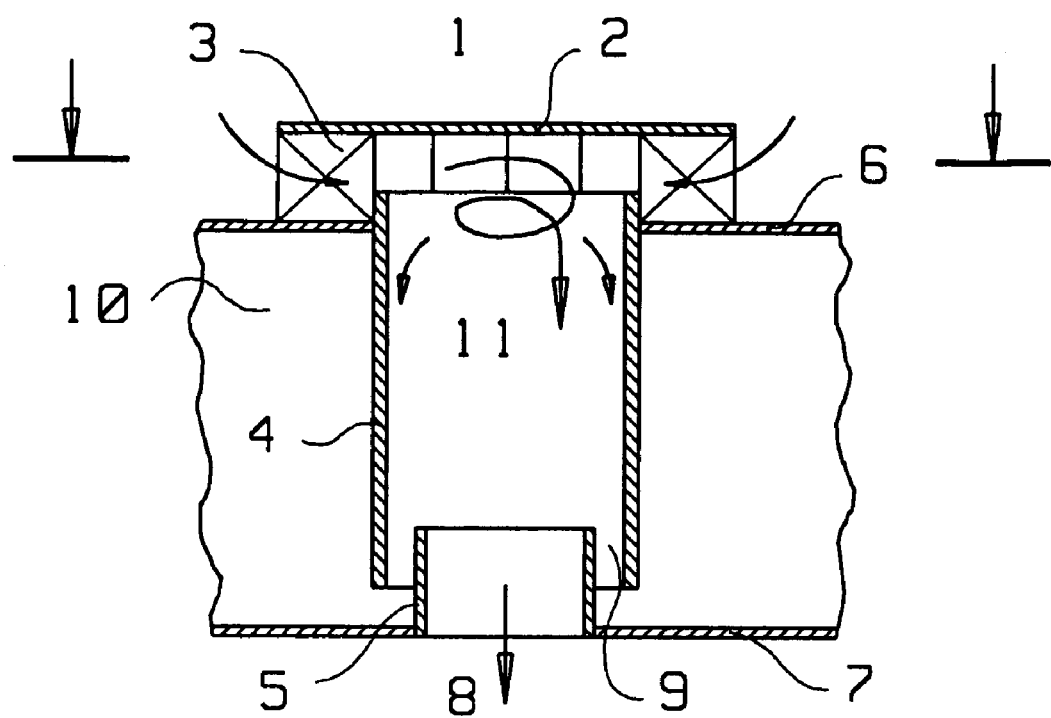
FIG. 1b depicts a cross-section of the cyclone.

In the method according to the invention for the separation of two phases from each other, a stream consisting of two phases is directed to a separation apparatus wherein the separation is carried out with a "cyclone system" made up of multi-inlet cyclones (i.e. an apparatus comprising a plurality of cyclones arranged in parallel). The stream being treated may consist, for example, of a gas stream containing a solid material, a gas stream containing suspended liquid drops, or a liquid flow containing solids. The term "cyclone" is used in the present invention to denote separators intended for the treatment of any of these streams, in which separators the separation is at least in part based on centrifugal force produced by the stream when it is directed to the wall of the separation chamber of the cyclone.

The essential difference as compared with the axial cyclones described in the preamble is that in the multi-cyclone according to the invention the stream being treated is directed to each multi-inlet cyclone in a substantially radial direction, i.e. the stream is introduced into the separation chamber from the side of the chamber, in a direction transverse to the longitudinal axis of the separation chamber. In cases in which the stream being treated is directed to the cyclone system in a linear flow motion, all of the individual cyclones of the cyclone system are preferably oriented in the same direction. They can, however, be arranged even in some other manner, for example so that the longitudinal axes of the separation chambers of any two adjacent cyclones together form an equal angle, which is smaller or greater than 90 degrees.

The multi-inlet cyclone is previously known, and it has been described in, for example, U.S. patent publication 3,969,096. Cascades made up of a plurality of multi-inlet cyclones are also known. In this respect we refer to the option disclosed in our PCT application publication WO 99/25469. The total separation degree can be improved significantly by the arrangement of a plurality of multi-inlet cyclones successively. In addition, considerable savings of space are achieved when the separator cascade is built up from multi-inlet cyclones, since the cyclones can be placed one inside the other. Our patent application FI 2000 0262 describes the fitting of multi-inlet cyclones in parallel, but therein the gases are removed in a direction different from that of the catalyst, in which case the construction becomes complicated and expensive, especially if the diameter of the cyclones is reduced.

The cyclone unit according to the present invention comprises at least ten multi-inlet cyclones arranged in parallel and in succession, each cyclone having a "cyclone cap" made up of a guide vane system which brings the solids-containing stream being treated into a substantially tangential flow in order to separate the solids from the gas, a rotationally symmetrical separation chamber attached to the "upper sheet," and a purified-gas outlet pipe that is coaxially disposed inside the separation chamber, the separated catalyst leaving together with a small gas stream and passing from between these pipes into the space between the upper and lower sheets, the inlet conduits of the multi-inlet cyclones communicating with one space, the ports for separated solids with another space, and the pipes for purified gas with a third, common space.

By arrangement "in parallel" is meant in the present invention that all cyclones have a common feed conduit and a common outlet conduit. The central part of the device is its separation chamber, the cross-section of its inner surface being substantially circular, i.e. the separation chamber is rotationally symmetrical with respect to its central axis. In a multi-inlet cyclone the central axes of the separation chambers of all parts are concentric. In the multi-inlet multi-cyclone the central axes of the cyclones may be oriented in the same direction or, if such a structure provides an advantage, radially, in which case the space for separated solids is the space formed between two cylinders.

The total number of multi-inlet cyclones is preferably 20–1000. They can be arranged in parallel and in succession in such a manner that, seen from above, they form a polygonal pattern. Usually they are arranged in the manner of a quadrangle, but generally they may be arranged in the pattern of a triangle, hexagon or octagon.

According to an especially preferred embodiment there is formed from the multi-inlet cyclones a cyclone cassette, which is easy to install and replace. Such a cassette structure can be fitted, for example, in a separation container, into which the stream to be treated is introduced via an inlet and from which the purified stream is removed via an outlet. The separation container may have several cyclone cassettes; preferably their number is 1–10. The ratio of the cross-sectional area of the separation container inlet port to the cross-sectional area of the separation container is relatively small, usually 1–20, which means an effective saving of space.

When solids are being separated from a gas, gravity often suffices to transfer the solids from the cyclone separation chamber to the solids collection vessel and removal. When a liquid phase containing solids is being treated, it is, instead, advantageous to rinse off the solids separated from the liquid by directing to the separation chamber a flowing medium, usually a pure liquid such as water, in order to form a suspension which contains solids. This suspension is thereafter removed separately from the solids-free liquid phase that has been treated in the separation chamber. The solids are thereafter separated in a separate cyclone from the said suspension obtained from the separation chamber. Preferably the separation chamber of the said cyclone is in a substantially vertical position.

Preferably the separation surface is increased by fitting the multi-inlet cyclone system in a position oblique to the stream to be treated. Thus the stream is introduced into a multi-inlet cyclone system wherein the longitudinal axes of the separation chambers of the cyclones are arranged at such an angle relative to the horizontal plane that they form an angle of 30–90°, preferably approx. 45–90°, to the horizontal plane.

The individual multi-inlet cyclones of the cyclone system according to the invention comprise each a cylindrical separation chamber on the inlet side of which there is arranged a separation vane system for guiding the stream to be treated to the wall of the separation chamber. Furthermore, the separation chamber is covered with a cover sheet to direct the stream introduced into the cyclone into the separation chamber in a radial direction. According to a preferred embodiment, the separation vane system is connected to the said cover/cover sheet. By means of the guide vane system the gas being treated can be brought into a gas flow along the inner surface of the separation chamber in order to separate the solids from the gas under the effect of centrifugal force. There are at least 2, preferably 3–20, guide vanes. The guide vanes in the cyclone are fitted in a circle on the circumference of the cyclone chamber, in part or entirely as a flow conduit guide vane system so that this system forms a plurality of parallel gas inflow conduits. In the separation chamber there is further arranged a central pipe for the removal of the gases and a conduit for the recovery of the solids separated from the gas.

In a preferred embodiment of the invention, the multi-inlet cyclone's separation vane system, which is formed as a piece integral with the cover covering the inlet end of the separation chamber, comprises strips formed in the outer edge of the cover by cutting and bending into the desired position. The cover or cap need not be fastened gas-tightly to the cyclone pipe; it may be a separate part fitted on top of the cyclone pipe, in which case its attaching, repairing and possible cleaning can be done easily. Such a cover is made, for example, from one polygonal blank sheet the number of angles in which corresponds to the number of vanes in the vane system. The cover can be made from the said sheet by first marking a bending line which runs from the center point of the sheet to the center point of each side, whereafter a cut is made in the sheet from the center point of the adjacent side of each side perpendicularly towards this first bending line as far as the bending line. The cut strip is bend from the continuation of the cutting line to a 90-degree angle relative to the plane of the sheet, and then along the first bending line to such an angle that, when the cover is installed in place, the vane points at least approximately in a direction tangent to the separation chamber wall.

In the manner disclosed, the vane system can be formed from a sheet by cutting and bending, completely without any weld or other corresponding seam.

Owing to its good separation capacity, the separation chamber of a multi-inlet cyclone may be shorter than the separation chamber of an axial cyclone. Thus, in the option according to the invention, the ratio of the length to the diameter of the separation chamber of an individual multi-inlet cyclone is approx. 1:1 . . . 3:1.

The outlet ends of the separation chambers of the multi-inlet cyclones open into a common collection space for the separated solid or liquid material. Each separation chamber has an outlet pipe for the fluid substance free of the separated solids or liquid, this pipe being arranged concentrically inside the separation chamber.

From the multi-inlet cyclones described it is possible to manufacture the cyclone cassette described above by fitting the cyclones between two sheets, an upper sheet and a lower sheet. The upper sheet and the lower sheet are interconnected at their sides, but so that between them is left at least one opening from which the material collected in the intermediate space can be removed. The cassette option thus in general comprises a first sheet, a second sheet arranged at a distance from the first sheet, and at least 10 multi-inlet cyclones which are perpendicular to the sheets and of which each extends through the first sheet and the second sheet in such a manner that the inlet end of the cyclone separation chamber opens into an opening in the first sheet, the outlet end of the outlet pipe opens into an opening in the second sheet, and the outlet end of the separation chamber opens into the space between the first sheet and the second sheet, this space constituting the collection space for the separated solid or liquid material. The cassette is usually substantially planar, but it may also be cylindrical or curved.

According to a preferred embodiment the cassette can be manufactured by, for example, thin-sheet technology and working methods associated with it. The cassette is made from sheet metal, inlet and outlet pipes (inlet and outlet ports) are fastened gas-tightly to it, and on top of the inlet pipe there is fitted a cover made up of a cyclone vane system.

We have noted that the separation capacity of a cyclone is better when the gas or corresponding flowing medium is removed in the same direction as the solids, since the axial flow in the outlet conduit will not carry with it the already separated solids. As was pointed out above, a uniflow type flow provides a simple and advantageous construction.

In an operation according to the invention, it is not necessary to make the common catalyst collecting space of the cyclones conical as has been done, for example, in Shell's. TSS separator: when the cyclones are installed in a common cassette, the solids can be removed by installing the entire cassette obliquely or vertically. When the gas is removed through the apparatus, this option is possible. The cassette structure facilitates cleaning and maintenance work; the entire cassette can be replaced and cleaned on premises suitable for the purpose. The structure also facilitates its application to existing conduits, since the element can be shaped freely (in a round or angular, vertical or horizontal conduit). The solids collect in the common, closed space inside the cassette and can be removed from the lower part of the cassette. Solids made up of small particles are best removed in the form of a thick suspension, i.e. a small amount, 1 . . . 3%, of the gas travels with the solids.

In the method according to the invention, the multi-inlet multi-cyclones can be formed as part of a multi-stage separation apparatus. Thus, according to the first embodiment of the invention, the separation apparatus comprises a 1-stage or 2-stage primary separator and a secondary separator that is the multi-inlet multi-cyclone described above. In this context we refer to the option disclosed in application publication WO 99/25469.

The apparatus and process described above can be applied to the separation of a catalyst from the product gases of fluid-catalytic cracking (FCC). The multi-inlet multi-cyclone can be used especially advantageously in the regenerator of an FCC unit for separating the regenerated catalyst from the coke combustion gases.

Other fluid catalytic applications include: catalytic reforming; oxidizing dimerization of phthalic acid anhydride, maleic acid anhydride, methane; Fischer-Tropsch synthesis; chlorination and bromination of methane, ethane, etc.; and the conversion of methanol to olefins and gasoline.

In the production of liquid fuel from chips, there is formed, in addition to the products, a carbonization residue (coke), from which the portion that cannot be separated by means of the reactor cyclones travels, together with the gaseous-state product, to product condensers and is left in the forming liquid fraction. Maximally effective separation of the carbonization residue is of primary importance for the stability of liquid fuel made from chips. For this purpose, the option according to the invention is, in terms of investment, considerably more economical and more reliable in operation than the previously used hot filters. That portion of the carbonization residue separated by the reactor cyclones travels together with the used fluidization material into the combustion chamber (regenerator), where it is burned, the heat-transferring solids serving as the fluidization material. In the process there is produced ash, which has to be removed from the hot combustion gas before the combustion gas is directed to the biomass dryer. It is also advantageous to remove the ash from the hot combustion gas by using a cyclone system according to the invention. The fuels usable in the process include various biologic materials and waste products. The biomass feedstock is preferably selected from among forest industry wastes and forest thinning residues; agricultural waste such as straw, residues from olive thinning or harvesting; energy plants such as willow, energy hay, Miscanthou and peat. The wastes are most preferably organic, solid or liquid, and they are selected from among refuse-derived fuel (RDF), sawmill waste, plywood, furniture and other waste of the mechanical forest industry; waste plastics; and liquid waste (including industrial and municipal waste).

The option according to the invention is especially advantageous for application in cases in which the purification has to be carried out under elevated pressure, such as: pressurized fluid bed combustion (PFBC) and integrated gasification combined cycle (IGCC) power plant. In these, the combustion gas has to be purified especially effectively in order to minimize the erosion-corrosion of the gas turbine blades. By the application of the cyclone system according to the invention, the use of very expensive hot filtration implemented with ceramic sinters can be avoided.

In atmospheric partial oxidation (gasification) of a solid fuel wherein the product gas is burned, the cyclone system according to the invention can be used for the removal of ash from either the product gas or the combustion gas.

For the removal of dust from a gas stream, the cyclone system according to the invention can be used, for example, in the purification of the intake air of gas turbines, in the extractive, metal, carpentry, food, pharmaceutical and chemical industries and in HEPAC applications (air-conditioning, vacuum cleaners). The option is also suitable for the removing of small liquid drops (mist) from a gas stream, and it can replace, for example, space-consuming demister systems in industry, which systems are based on causing drops to impinge against a structure made from sheets or wire.

Hydrocyclone options are used, for example, in connection with oil drilling and in the extractive industry, as well as various chemical processes in which solids are separated from liquids. Multi-cyclones made up of very small cyclones are already being used in these. The cyclone system according to the invention is, however, simpler and thus considerably more economical in terms of investment than are present-day options.

In the process for producing liquid fuel from chips, multi-inlet cyclones can be used on the product side for the removing of carbonization residue particles from the product gas and instead of a demister in the separation of uncondensed gases and liquid product. Furthermore, the space-consuming liquid separation drums in the flare line can be replaced with the multi-inlet cyclone option according to the invention.

The preferred embodiments according to the drawings are discussed below.

Figure 1A:
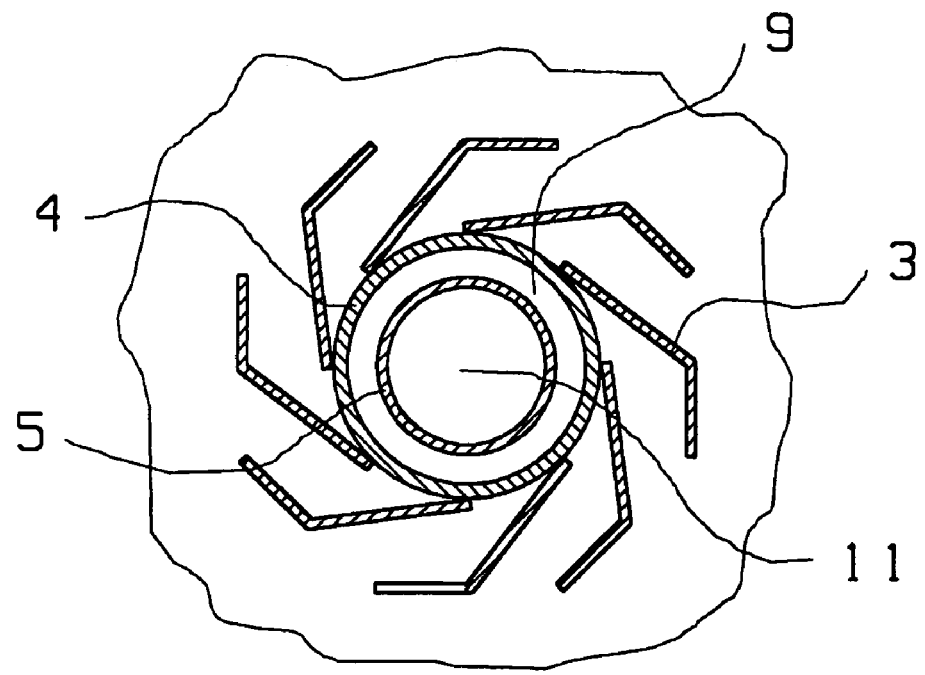
FIG. 1a depicts the principle of the structure of an individual cyclone of the cyclone system according to the invention, as a cross-sectional side-elevation.

FIG. 1a shows a side elevation of a cyclone element according to the invention, which is part of the multi-cyclone according to FIGS. 3, 4, 5 and 6. FIG. 1b shows a cross-section of the cyclone element.

According to a preferred embodiment, the vane system of a small-sized cyclone is made from one single thin sheet piece, for example, a metal sheet piece, by cutting and bending the edges of the piece into a certain polygonal shape without a weld or other similar joint. The obtained piece serves as the cover for an individual cyclone in the cyclone cassette.

Figure 2B:
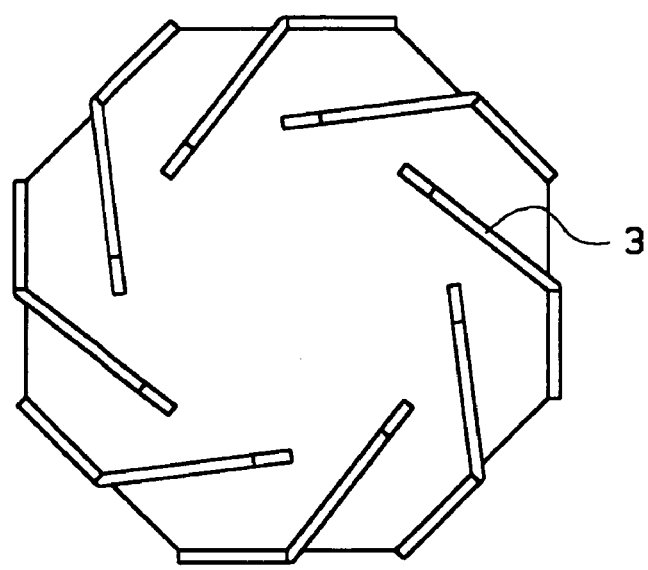
FIG. 2a depicts, seen from above, a sheet blank used for forming the cover 2 of the cyclone according to FIG. 1a, and FIG. 2b depicts, seen from below, the cyclone cover according to FIG. 1a, bent into shape.
Figure 2A:
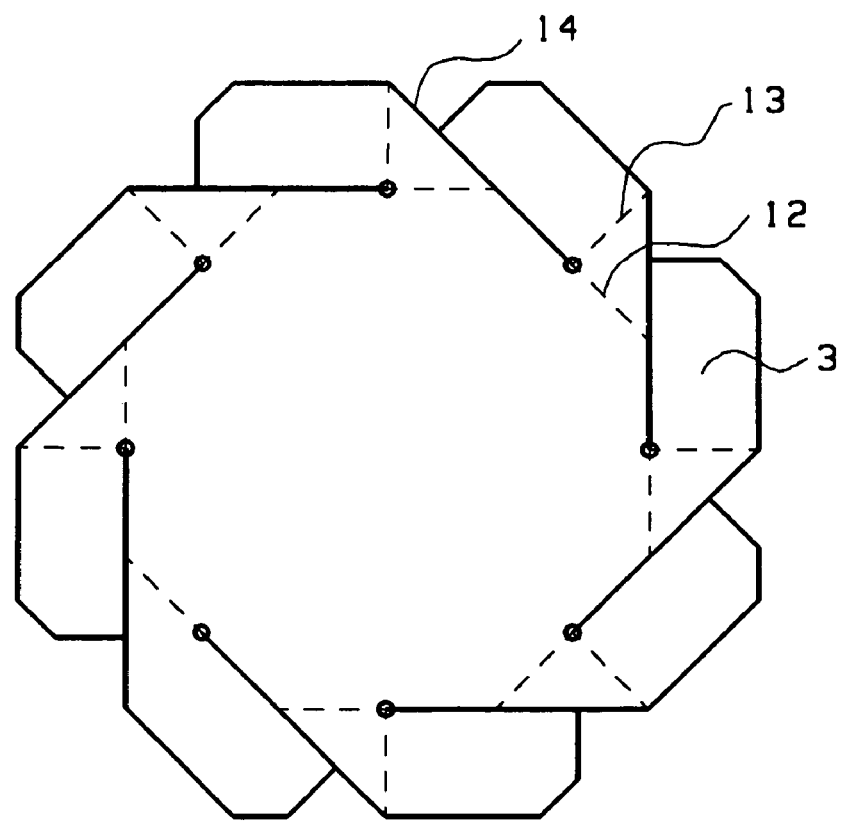

FIG. 2a shows one possible blank; by bending this blank at bending lines 12 and 13, there is obtained the completely shaped vane system shown in FIG. 2b. Alternatively the cyclone cap 2 can be made, for example, by injection molding from plastic or by casting from metal.

The gas and the solid particles or liquid drops carried therein it travel to all of the cyclones in the multi-cyclone through a common conduit 1, into vane slots between the vanes 3 of the cyclone cap 2. The cyclone vanes 3 guide the gas stream into a rotary motion in the space 11 inside the cyclone chamber, whereupon the particles separate from the gas onto the chamber wall 4 and travel through the space 9 between the cyclone chamber wall 4 and the pure-gas outlet pipe 5 into the inner space 10 of the cassette, which is space common to the parallel cyclones in the same cassette. The separated solids and the purified gas are removed from the cyclone chamber in streams that flow in the same direction.

The purified gas travels via the outlet pipe 5 into the purified-gas space 8, which is a space common to all of the cyclones of the cyclone system. The cyclone separation chamber is fastened to the first sheet 6, and the cyclone cap 2 is centered by means of the vanes 3 on the outer surface of the inlet end of the cyclone separation chamber 4. The outlet end of the outlet pipe 5 is fastened to the other sheet 7. The space between the sheets 6 and 7 constitutes the collection space for the solid or liquid material. When the sheets 6 and 7 are interconnected, there is obtained a vessel, cyclone cassette, which can be placed in the separation container connected to the gas conduit.

Figure 3A:
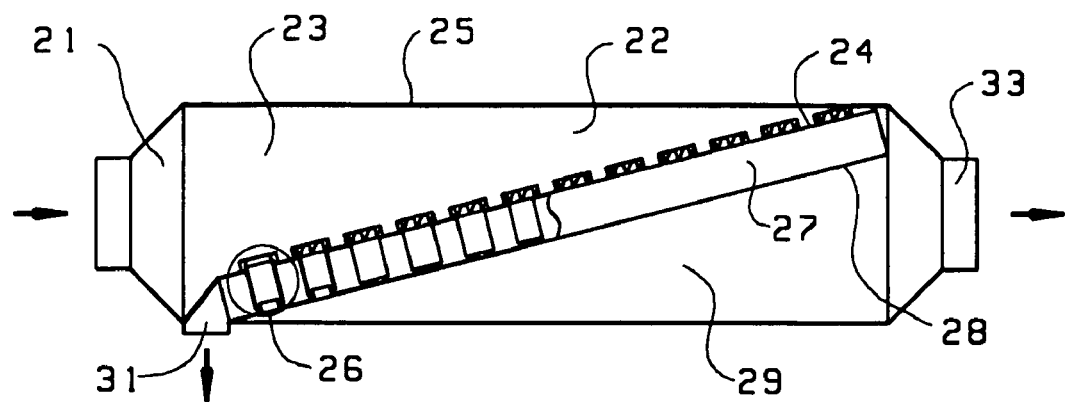
FIG. 3a depicts a side elevation of the structure of a container space comprising a multi-cyclone system according to the invention.
Figure 3B:
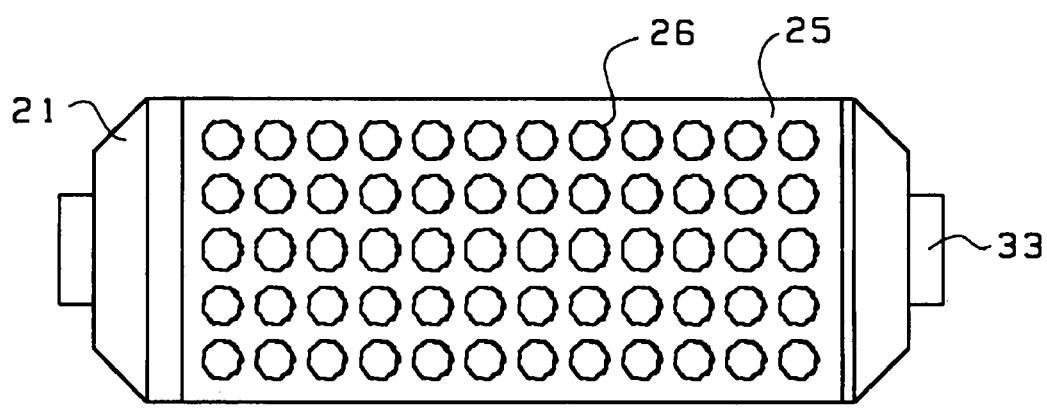
FIG. 3b depicts a corresponding plan view of the structure, partly opened.
Figure 4B:
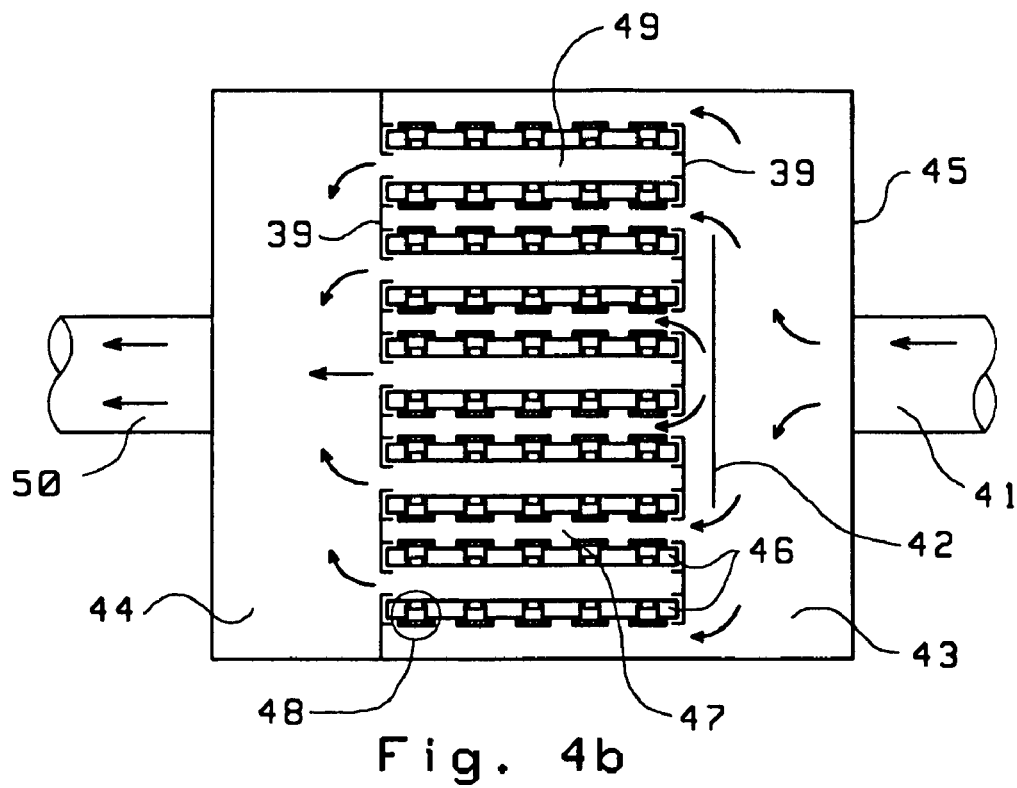
FIG. 4b shows a plan view of the same option.

FIGS. 3 and 4 show possible options for locating a cyclone cassette as part of a flow conduit.

FIG. 3 shows the structure of a separation apparatus according to the invention. In the separation apparatus there is fitted inside the separation container 25 a cyclone cassette 22, which is made up of in particular two sheets 24, 28, oriented in the same direction and fastened to each other, between which and fastened to which there are cyclone elements 26, and of fixedly fastened edge sheets between the sheets in all directions. The cassette 22 is installed obliquely across the entire gas conduit. On the upper, upstream side of the cassette, there is a perforated sheet 24 in each perforation of which, inside the cassette, there is fastened air-tightly a separation pipe that is shorter than the distance between the sheets and, outside the cassette, a cover sheet larger than the perforation, on the lower surface of which, between the cover and the upper sheet, there are fastened the guide vanes of the cyclone. The bottom sheet 28, on the lower, gas-outlet side, has perforations in alignment with those in the upper sheet, the diameter of these latter perforations being smaller than those in the upper sheet and there being fastened to them air-tightly, inside the cassette, outlet pipes having a smaller length than the separation pipes.

The gas stream to be purified enters the separation container 25, passing from the separation port 21 into the space 23, and is divided among the cyclone elements 26. The functions of a cyclone element are described in connection with FIG. 1. The purified gas enters the space 29 for purified gas through the cassette and leaves via port 33. The stream of solids or liquid leaves via port 31. A structure such as this is especially advantageous when there is separated from a gas stream a liquid, which flows easily inside the space 27 to the outlet port 31.

Figure 4A:
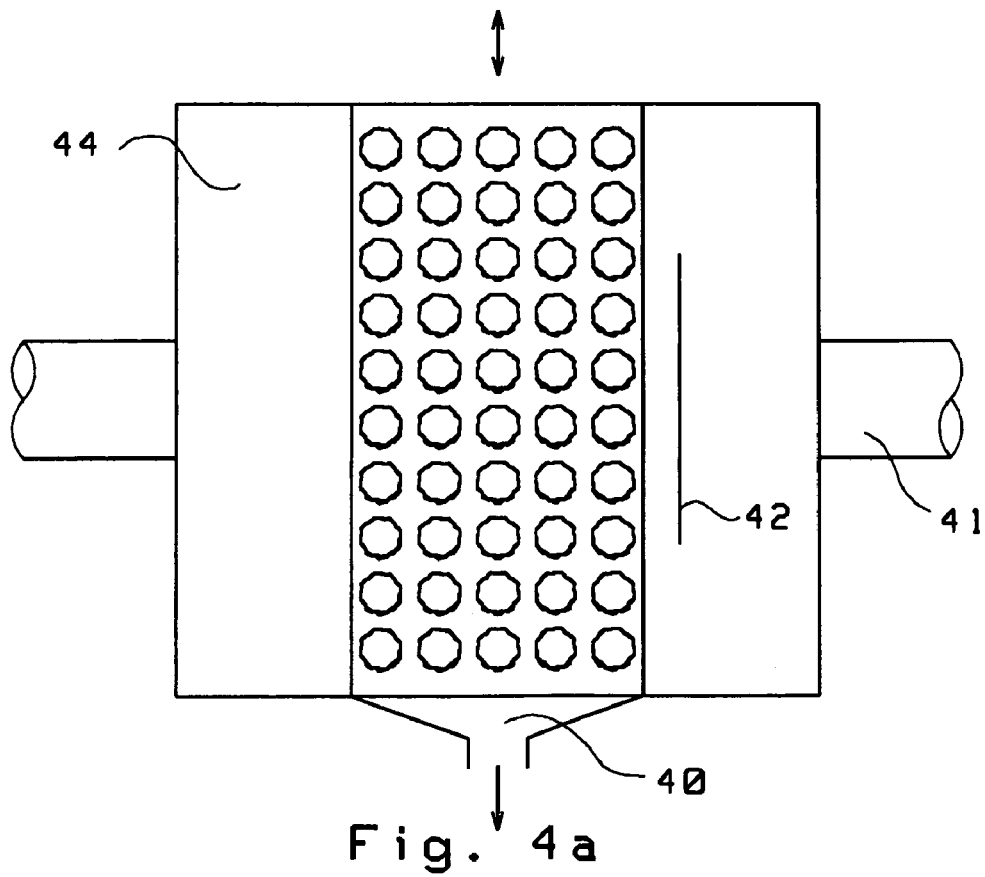
FIG. 4a depicts a side elevation of a filter package according to the invention.

In FIGS. 4a (side elevation) and 4b (plan view), the cyclone cassettes are installed in a vertical position and the cyclone elements are horizontal. The gas stream to be purified arrives via port 41 into space 43 of the separation container 45 and divides into the space 47 between the cyclone cassettes 46 and then further to cyclone elements 48. To divide the stream in space 43 it is possible to use flow guides 42. The purified gas comes via the cassette into space 49 and further to a common space 44. The purified gas leaves the separation container via port 50. The lower parts of the cyclone cassette are connected to outlet ports 40, through which the separated solids are removed from the separator. This structure is especially advantageous when cassettes need to be handled owing to erosion or soiling. The cassettes can in this case be installed in slots 39 and can thus be removed via the upper or lower part of the apparatus for repair, replacement or maintenance.

Figure 5:
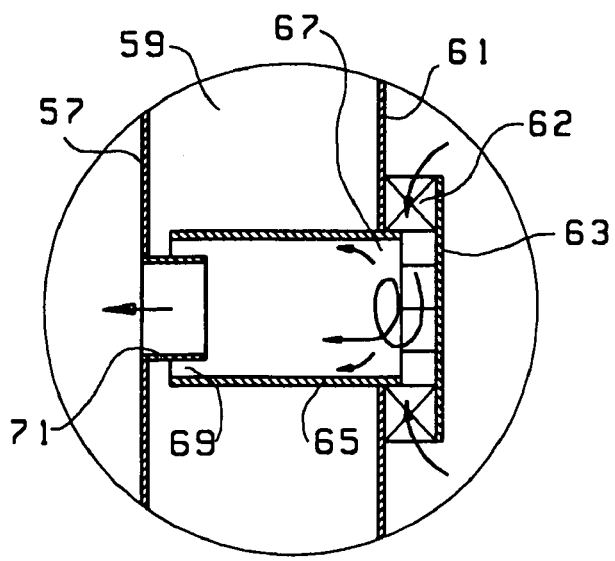
FIG. 5 depicts a side elevation of a cyclone system having a cylindrical shape.
Figure 5:
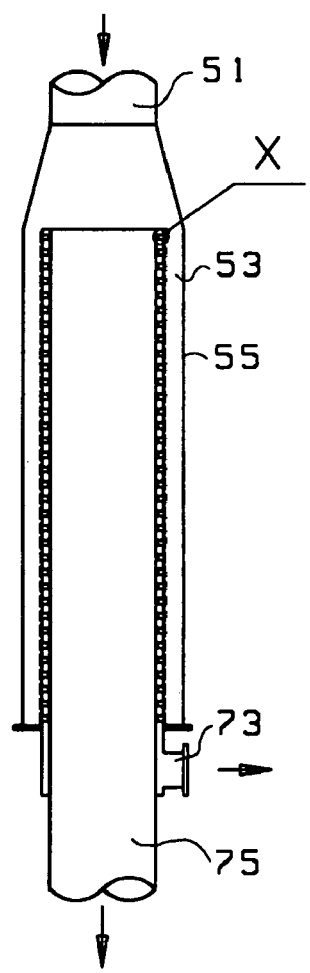
Figure 6:
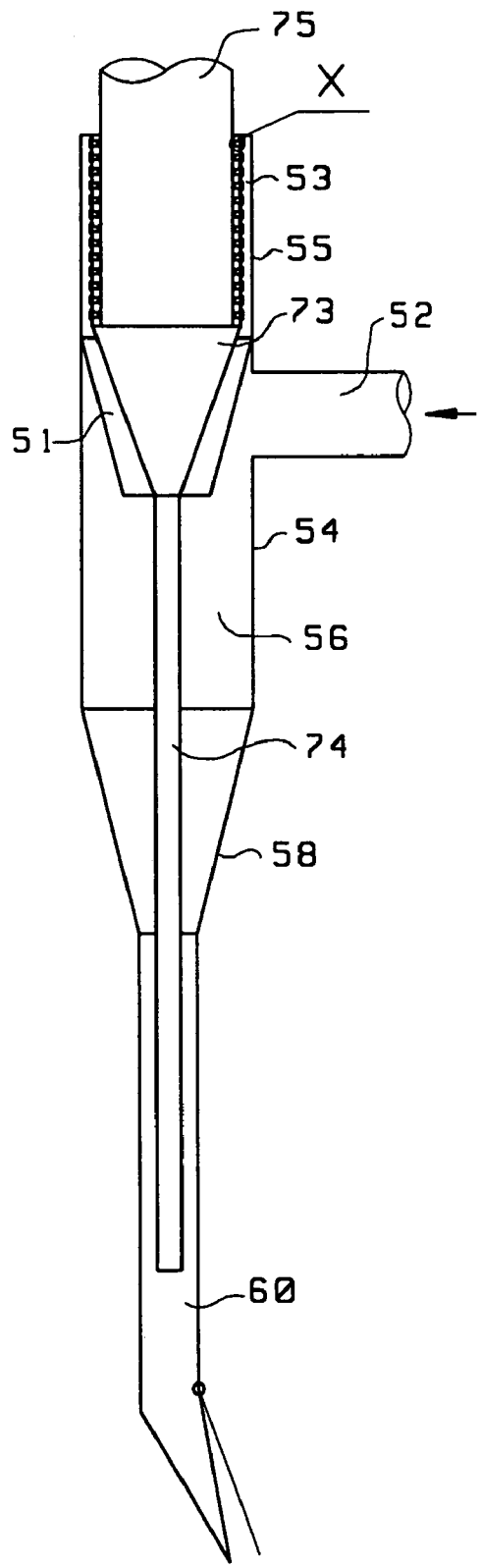
FIG. 6 depicts a side elevation of a cylindrical cyclone system serving as the second-stage separator in a separation apparatus.

FIGS. 5 and 6 depict a cyclone system according to the invention, having a cylindrical shape. The cyclone element picture DET.X is common to both figures.

In FIG. 5 the gas to be purified comes, via the feed port 51 for the stream to be treated, to the space 53 inside the separation container, from which space the gas divides to the cyclone elements disposed in parallel. Inside a cyclone element the gas travels via the vane slots of the cyclone cap 63, where the vanes 62 direct the gas into a rotary motion inside the cyclone chamber 67. The particles separate from the gas to the wall 65 of the cyclone chamber and travel through the space 69 between the cyclone chamber wall 65 and the outlet pipe 71 for pure gas to the solids separation space 59. The separation space is the space delimited by the outer cylindrical wall 61 of the cyclone system and its inner cylindrical wall 57. The purified gas travels via the outlet pipe 71 to the space 75 for purified gas, which is a space common to all of the cyclones of the multi-cyclone. The separated solids are directed out of the separator via port 73. Often, for the purpose of solids transport and a smooth flow of the gas, it is preferable to direct together with the solids a small amount of gas, in which case the solids are considerably more concentrated in the carrier gas stream. In this case the suspension is directed via port 73 to a further outside separator, where the solids are separated from the carrier gas.

FIG. 6 shows how the cyclone system can be installed to serve as a second-stage separator. The gas to be purified comes into the separator through the feed port 52 for the stream to be treated; the separator is in this case a conventional 1-inlet cyclone. The gas enters tangentially the cyclone chamber 56, where the particles separate to the cyclone wall 54 and continue their travel via the cyclone cone 58 to the cyclone leg 60. The pre-purified gas travels in the space 51 to the space 53 inside the separation container 55, from where the gas is divided in the manner shown in FIG. 5 to cyclone elements, which are disposed in parallel. Inside the cyclone elements the gas and particles travel as indicated in the description of FIG. 5. The solids separation space 59 communicates with a common conical part 73, from where the separated particles travel to the dipleg 74 and further to the dipleg 60 of the first-stage separator.

The invention claimed is:

1. A method for separating two phases from each other, which comprises:
   directing a stream made up of at least two phases to a separation apparatus which comprises a separation container and cyclones arranged in parallel or in succession in the flow direction, the cyclones each having an elongate separation chamber in which the phases are separated from each other,
   wherein the cyclones used are multi-inlet cyclones having a total number of at least 10 and in which the separated phases are removed in the same direction; wherein the stream to be treated is directed to enter each multi-inlet cyclone in a substantially radial direction transverse to the flow direction and the longitudinal axis of the separation chamber; and wherein the cyclones together form a cassette which may be installed and replaced into the separation container.

2. The method according to claim 1 wherein the separation chambers of the multi-inlet cyclones are oriented in the same direction.

3. The method according to claim 1, wherein the separation apparatus comprises 20–1000 multi-inlet cyclones arranged in parallel and in succession.

4. The method according to claim 1, wherein the ratio of the length to the diameter of the separation chamber of an individual multi-inlet cyclone is approximately from 1:1 to 3:1.

5. The method according to claim 1, wherein the multi-inlet cyclones are arranged in a cyclone cassette which is fitted detachably inside a separation container that comprises an inlet for the stream to be treated and an outlet for the purified stream.

6. The method according to claim 5, wherein the number of cyclone cassettes in the separation container is 1–10.

7. The method according to claim 1, wherein a solid is separated from a liquid phase in the cyclone separation chamber, wherein a flowing medium is directed to the separation chamber to form a solids-containing suspension, and the suspension is removed from the separation chamber separate from the liquid phase.

8. The method according to claim 7, wherein the solids are separated from the suspension obtained from the separation chamber by means of a separate cyclone having a separation chamber in a substantially vertical position.

9. The method according to claim 1, wherein the stream is directed to a multi-inlet cyclone system wherein the separation chambers of the cyclones are arranged so that their vertical axes are oblique to the horizontal plane in such a manner that they form an angle of approximately 30–90° with respect to the horizontal plane.

10. The method according to claim 1, wherein the stream is made up of carbonization residue and the flue gases of a process based on a biologic fuel.

11. The method according to claim 10, wherein the carbonization residue is removed from the outlet gas obtained from the preparation of liquid fuel from chips.

12. The method according to claim 10, wherein ash is removed from a hot flue gas.

13. The method according to claim 1, for separating solids at elevated pressure from flue gases.

14. The method according to claim 13, wherein the flue gases are purified which originate in pressurized fluid-layer combustion or an integrated gasification combined cycle power plant.

15. The method according to claim 1, wherein the stream is directed to a multi-inlet cyclone system wherein the separation chambers of the cyclones are arranged so that their vertical axes are oblique to the horizontal plane in such a manner that they form an angle of approximately 45–90°, with respect to the horizontal plane.

16. A cyclone system comprising cyclones arranged in parallel or in succession, wherein the cyclones are multi-inlet cyclones the total number is at least 10 and in which the separated phases are removed in the same direction; wherein the cyclones each have an elongate chamber along a longitudinal axis and inlets which direct a stream made up of at least two phases to enter into the elongate chamber in a substantially radial direction transverse to the longitudinal axis; and wherein the cyclones together form a cassette which may be installed or replaced within a larger separation container.

17. The cyclone system according to claim 16, which comprises 20–1000 multi-inlet cyclones arranged in parallel and in succession, each cyclone having an elongate separation chamber, and the separation chambers of the multi-inlet cyclones being oriented in the same direction.

18. The cyclone system according to claim 16 or 17, wherein an individual multi-inlet cyclone comprises a cylindrical separation chamber on the inlet side of which there is arranged a separation vane system for guiding the stream being treated to the wall of the separation chamber.

19. The cyclone system according to claim 18, wherein the separation chamber of the multi-inlet cyclone is covered with a cover sheet for directing into the separation chamber in a radial direction the stream being fed into the cyclone.

20. The cyclone system according to claim 19, wherein the separation vane system is connected to the cover.

21. The cyclone system according to claim 16, wherein the ratio of the length to the diameter of the separation chamber of an individual multi-inlet cyclone is approximately from 1:1 to 3:1.

22. The cyclone system according to claim 16, wherein the outlet ends of the separation chambers of the multi-inlet cyclones open into a common collection space for the separated solid or liquid material.

23. The cyclone system according to claim 16, wherein the separation chamber of each multi-inlet cyclone has an outlet pipe for the flowing material free of the separated solid or liquid material, the outlet pipe being arranged concentrically with the separation chamber.

24. The cyclone system according to claim 23 which comprises
a first sheet,
a second sheet, which is arranged at a distance from the first sheet, and
at least 10 multi-inlet cyclones, which are perpendicular to the sheets and each of which extends through the first and the second sheet so that
the inlet end of the cyclone separation chamber opens into an opening in the first sheet
the outlet end of the outlet pipe opens into an opening in the second sheet, and
the outlet end of the separation chamber opens into the space between the first sheet and the second sheet, this space constituting the collection space for the separated solid or liquid material.

25. The cyclone system according to claim 24, which it is substantially planar, cylindrical or curved.

26. A separation apparatus for separating at least two phases from each other, the apparatus comprising:
a separation container having a feed port for the stream to be treated, an outlet port for the treated stream, and, in the bottom of the separation container, an outlet port for the separated phase, and
a cyclone system arranged inside the separation container, the system having cyclones arranged in parallel in the direction of the flow, each system having an elongate separation chamber in which the phases of the stream directed into the cyclone can be separated from each other,
wherein the cyclone system comprises at least 10 multi-inlet cyclones arranged in parallel and in succession and in which the separated phases can be removed in the same direction; wherein the cyclones each have an elongate chamber along a longitudinal axis and inlets which direct a stream made up of at least two phases to enter into the elongate chamber in a substantially radial direction transverse to the longitudinal axis; and wherein the cyclones together form a cassette which may be installed or replaced within a larger separation container.

27. The separation apparatus according to claim 26, wherein the cyclone system is arranged at an angle to the horizontal plane so that the longitudinal axes of the separation chambers form an angle of more than 0–90 degrees with respect to the horizontal plane in order to transfer the phase separated from the stream by means of gravity and/or a small amount of gas to the outlet port for the separated phase.

28. The apparatus according to claim 26 or 27 wherein the number of cyclone systems in the separation container is 1–10.

29. The apparatus according to claim 26, wherein the ratio of the cross-sectional area of the feed port to the cross-sectional area of the separation container is 1–20.

30. The apparatus according to claim 26, wherein the cyclone cassette comprises:
a first sheet,
a second sheet, which is arranged at a distance from the first sheet,
at least 10 multi-inlet cyclones, which are perpendicular to the sheets and each of which extends through the first sheet and the second sheet so that
the inlet end of the cyclone separation chamber opens into an opening in the first sheet
the outlet end of the outlet pipe opens into an opening in the second sheet, and
the outlet end of the separation chamber opens into the space between the first sheet and the second sheet, this space constituting the collection space for the separated solid or liquid material.

31. The apparatus according to claim 26, wherein at the inlet end of the separation chamber of the multi-inlet cyclone there is located a separation vane system for guiding the stream being treated against the wall of the separation chamber.

32. The apparatus according to claim 31, wherein at the inlet end of the multi-inlet cyclone there is a cover sheet, which is connected to the cover.

* * * * *